April 2, 1946. J. G. FRANCIS 2,397,479
WATERING TROUGHS FOR POULTRY AND MEANS FOR AUTOMATICALLY
CONTROLLING THE SUPPLY OF WATER THERETO
Filed Feb. 5, 1944

INVENTOR
John Gilbert Francis
BY
his agent

Patented Apr. 2, 1946

2,397,479

UNITED STATES PATENT OFFICE 2,397,479

WATERING TROUGH FOR POULTRY AND MEANS FOR AUTOMATICALLY CONTROLLING THE SUPPLY OF WATER THERETO

John Gilbert Francis, Heidelberg, near Melbourne, Victoria, Australia

Application February 5, 1944, Serial No. 521,178
In Australia January 30, 1943

8 Claims. (Cl. 119—81)

This invention relates to improvements in and connected with drinking vessels or troughs for poultry and in the means for automatically controlling the supply of water to the said vessels or troughs.

Wet patches are generally to be found about the drinking vessels or troughs installed by poultry keepers. These wet patches are most undesirable. In addition to being insanitary they cause serious losses to poultry farmers and breeders because of the practice poultry make of drinking from puddles which act as breeding grounds for disease. The moist earth, it is known, conduces to germ growth and incubation of worm eggs and the oöcysts of coccidiosis.

An important object of my invention is to provide improvements in drinking vessels such as will prevent dispersal of water by poultry which has been one cause for the undesirable wet conditions generally prevailing in poultry pens.

Another object is to provide a drinking trough for poultry equipped with devices which will preclude the overflow of water from the trough under all ordinary conditions, and with other devices to prevent waste of water with resultant wet conditions in a poultry pen due to discharge of water whenever it is required to temporarily remove the trough for cleaning, the trough being normally suspended at one end from a fulcrummed lever co-acting with a valve which is automatically controlled by the weight of the trough and its water contents acting on said lever.

A further important object of the invention is to provide drinking vessels or troughs having devices which automatically control the supply of water in such manner as will ensure the maintenance at all times of water supply and satisfactorily meet practical requirements for watering poultry, irrespective of differential pressures in water supply systems and the variations in pressures which from time to time take place in individual water supply systems serving the drinking vessels or troughs.

With these and other objects in view, the invention consists of the features of construction, combination and arrangement hereinafter described and claimed, reference being made to the accompanying drawing wherein:

Figure 2:
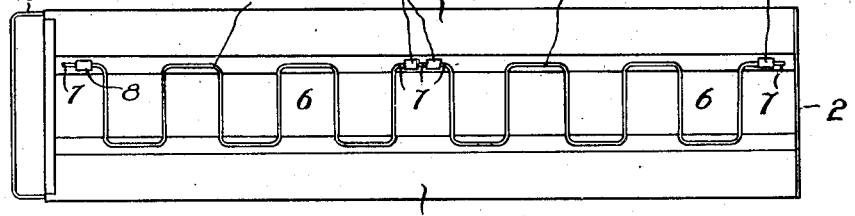
Fig. 2 is a plan view of the suspended drinking trough seen in Fig. 1.

In these views 2 designates a drinking trough for poultry which is of approximately U-shape in cross-section, having a depth greater than its width and of such length as will provide the requisite capacity for the poultry to be watered. The trough which advantageously may be made from galvanized sheet metal has its side walls outwardly curved at their upper end portions 3, and it has lateral flanges 4 of substantial width extending from end to end on opposite sides as is seen in Fig. 2. The flanges are provided to support the wattles of poultry when drinking at the trough and prevent immersion of the same in the water and the said flanges have a slight downward slope towards the body of the trough.

Extending horizontally across the upper part of the trough body are a number of grids 5—two being shown in the drawing. These grids partition the trough into a series of drinking compartments 6 each suitable for one bird, and in addition they serve as guards by preventing poultry from entering bodily into the trough and dispersing the water contained therein.

The said grids are preferably formed of wire and they have their opposite ends shaped as pintles 7 which are journaled in bearings 8 provided on one side of the trough so that the said grids can be hingedly raised to permit the trough to be cleaned and subsequently lowered to normal position. The inherent springiness of the wire enables the grids to be longitudinally compressed to release their pintles from the bearings should it be required to detach the said grids for repair or other purposes, and similarly when being replaced on the trough the said grids are compressed to permit the pintles to be sprung into said bearings and then released.

The drinking trough, which is adapted to be suspended at a suitable height above ground level, may be conveniently installed between two uprights such as 9 and 10 on a dividing line between two oppositely positioned pens in order that poultry in both pens can have free access to the one trough. A reinforcing wire frame 11 is secured to the marginal portions of the trough flanges 4. This frame has a longitudinal extension 12 protruding beyond one end of the trough.

A hook-shaped bracket 13 which is formed of strong flexible metal is fastened to the upright 9 and accommodates the end of said frame extension 12 whereby the trough is pivotally and detachably suspended at its outer end at a suitable distance above ground level.

The drinking trough at its opposite or inner end is suspended detachably and adjustably from a fulcrummed lever 14 associated with an automatic regulating valve 15.

The automatic regulating valve 15 is of known horizontal type having a flexible disc which is vertically seated and is adapted to control the passage of water through a port leading to a chamber in the valve whence it is discharged through a vertical delivery pipe 16. The valve is secured to an elbow fitting at the upper end of a vertical water pipe 44 which may be fastened to the upright 10 by a bracket 45.

The flexible disc is held on its seating by pressure exerted on its marginal portion by a cap 17 screwed into the valve casing, and said cap has a central hole through which is guided a slidable valve rod 18. Pressure exerted by the fulcrummed lever on the valve rod forces the latter inwardly whereby the central portion of the flexible disc of the valve is pressed with more or less force over the inlet port. By this means flow of water from the valve is automatically regulated from an "open-tap" condition when free flow of water through the valve is permitted to a "closed-tap" condition in which the water is completely shut off.

The lever 14 is fulcrummed on a pin 19 within a jaw formed integrally with the valve casing, and said lever has at its inner end a downward arm 20 to actuate said valve rod 18, and an upward projection 21 the purpose of which will be hereinafter explained.

A flexible cantilever 22 which is substantially of inverted L-shape and formed of spring wire is secured at its lower end to the fulcrummed lever 14, and a tension spring 23 which is secured at one end to the cantilever has its opposite end fastened to a link or coupling strip 24 formed with a series of holes 25, whereby it is adapted for adjustable connection to a pin 26 projecting from opposite sides of the valve casing. The spring 23 tends to maintain the lever 14 upwardly inclined with the flexible cantilever 22 off-centre. The angle at which the lever 14 is upwardly inclined for open-tap conditions is conveniently adjusted to meet different requirements by inserting the pin 26 through a higher or lower hole in the coupling strip 24.

The suspension device for supporting the inner end portion of the trough from the fulcrummed lever 14 is preferably made of wire and comprises a member 27 substantially of inverted V-configuration having at its upper end a vertical extension in the form of a loop 28 and at its lower end two lateral members 29 of U-shape which are set oppositely.

The lateral members 29 of the suspension device have their lower arms 30 extending inwardly for a considerable distance beneath the trough flanges 4; a tension spring 31 connects the upper end of the loop 28 with the outer end of the flexible cantilever 22.

An inclined tracking rod or ramp 32, preferably formed of wire, is secured to the outer end portion of the fulcrummed lever 14 and is set angularly to the cantilever 22. To ensure requisite rigidity of said ramp under operative conditions, it is formed with a stay member 33 which is fixed to the inner end portion of the lever 14. A grooved roller 34 is freely revolvable within the loop 28 of the suspension device and is adapted to ride upwardly and downwardly on the ramp 32 when the inner end of the trough 2 is being pivotally raised and lowered, the said movements being governed by the quantity of water which is contained in the suspended trough.

Secured oppositely and adjustably to the underneath surface of each of the longitudinal flanges 4 of the trough are a flexible cantilever 35 and a ramp 36 which are of similar construction to the components 22 and 32 previously described, but are disposed in angular settings which are opposite thereto. Tension springs 37 are connected to the lower arms 30 of the suspension device and to the free ends of the relative cantilevers 35. The said arms 30 are adapted to function in a manner similar to the grooved roller 34 in that they ride upon the ramps 36 in the movements imparted to the trough, upwardly on the ramps when the inner end of the trough is being pivotally depressed by the weight of its water contents and downwardly upon said ramps as the amount of water in the trough decreases and causes the inner end of said trough to be pivotally raised.

Figure 4:
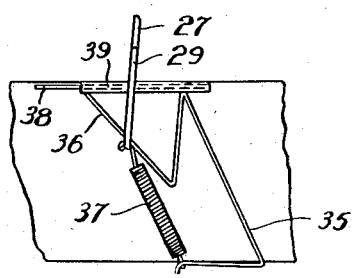
Fig. 4 is a detail view showing on enlarged scale one of the devices that are provided to automatically control the supply of water to the suspended drinking trough.

Each of the flexible cantilevers 35 with its associated ramp 36 is formed as a unit by being secured to a flat base plate 38—see Fig. 4, and for convenience of adjustment the said base plates are longitudinally slidable in guideways 39 secured to the underneath surfaces of the trough flanges 4.

Figure 3:
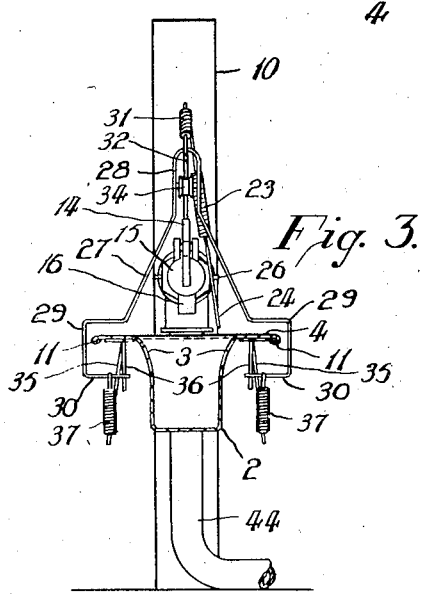
Fig. 3 is a vertical section on the line 3—3 in Fig. 1.

The advantages derivable from a water trough having wide lateral flanges 4 will be apparent, and the use with the trough of a suspension device having lateral members 29 with its lower arms 30 extending inwardly for a considerable distance beneath its flanges as is shown in Fig. 3 is particularly advantageous because it affords adequate suspensory support for the end of the trough and furthermore obviates risk of the trough being inadvertently detached even when it is placed in open fields where sheep or other animals may be present.

Figure 1:
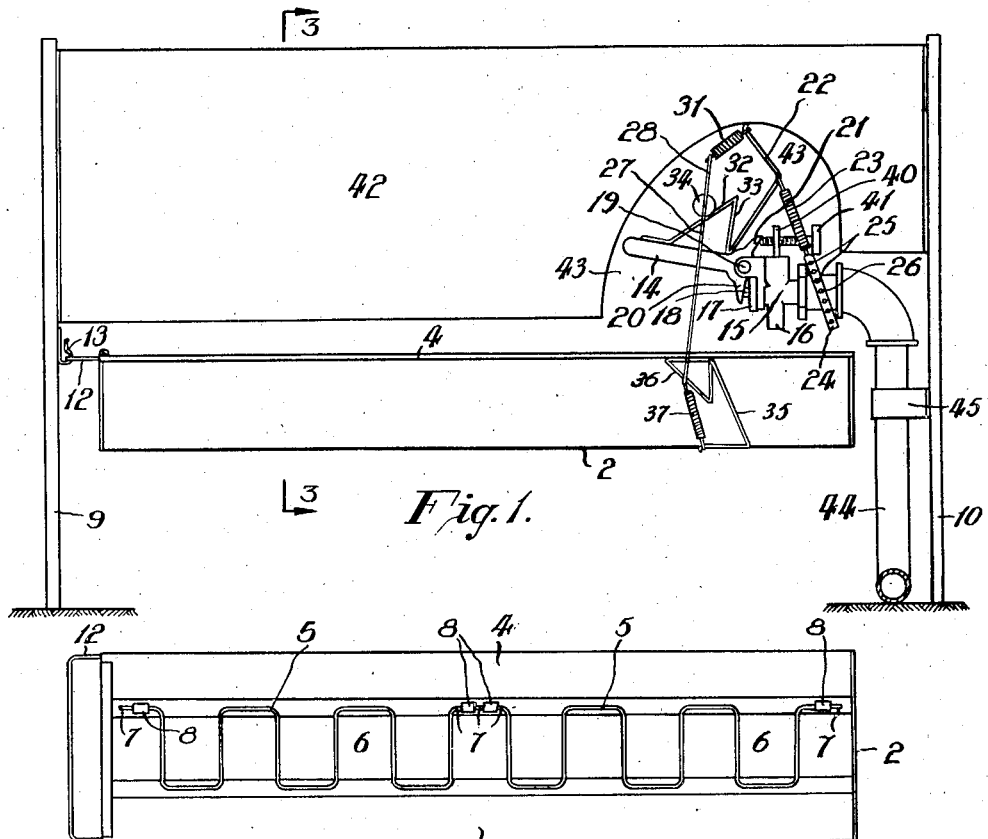
Fig. 1 is a view in side elevation illustrating the improvements in watering appliances for poultry.

The detachment of the suspended water trough 2 for cleaning or repair requires the use by a person of both his hands if spilling of its water contents is to be avoided. To avoid water waste with resultant wet conditions in a poultry pen on those occasions when it is required to remove a trough, I provide a vertical lug 40 which is formed integrally with the valve casing 15, and a horizontal locking screw 41 is passed through a threaded hole in said lug—see Fig. 1. When the fulcrummed lever 14 has been depressed to that degree which will shut off the flow of water, the screw 41 is given a few turns by finger pressure until its end impinges firmly against the upward projection 21 that is formed on the inner end of said lever. By this means the lever is restrained against upward movement which would cause water flow to and from the valve. When the cleaned or repaired trough is subsequently restored to its suspended position, the locking screw 41 is merely turned in the opposite direction and thus released from engagement with the said lug 40, whereupon the lever 14 will assume its normal upwardly inclined position and then be free to have pivotal movement on its fulcrum pin 19.

Vertically slidable in grooves formed in the uprights 9 and 10 is a partitioning board 42 which is disposed above the longitudinal centre line of the trough 2 and is provided to prevent poultry in one pen passing over the trough to gain access to the opposite pen. The said partitioning board has at its inner end a suitably shaped gap 43 in order that when it is lowered into normal position it will not foul the water supply fittings and the devices associated with the automatic regulating valve hereinbefore described.

In the use of the invention, the pin 26 is initially inserted through a selected hole in the coupling strip 24 to thereby give the fulcrummed lever 14 an upwardly inclined setting which is appropriate for the pressure of the available water supply or that used for watering the poultry. The higher the pressure of water may be, the lower is the hole 25 through which said pin is inserted. It will be obvious that the trough 2 suspended at one end from said fulcrummed lever will be inclined upwardly from the outer to its inner end and the valve-rod 18 will be freed from inward pressure exerted by the lever arm 20 to obtain the "open-tap" condition so that water will flow through the delivery pipe 16 into the trough.

The positions of the two base plates 38, each carrying a flexible cantilever 35 and ramp 36, are also adjusted in their longitudinal guideways whereby a suitable angular setting is given to the wire device 27—30 to suspensorily support one end of the trough with its water contents while ensuring correct action of the devices for automatically regulating the supply of water to the trough.

The weight of the suspended trough is taken by the tension spring 23. When water is initially delivered through the pipe 16 it flows from the inner to the outer end of the trough. In seeking its own level a body of the water moves towards the inner end of the trough and the weight of water then causes the lever 14 to be depressed against the tension of said spring 23, and the lever arm 20 is thus brought into abutment with the outer end of the valve-rod 18.

In the said initial action the grooved roller 34 travels but a short distance down the ramp 32. As the water continues to flow into the trough, the lever 14 is further depressed, the cantilever 22 is flexed at the same time, and the roller travels a further distance downwardly on said ramp against the tension of both springs 23 and 31. Simultaneously, the cantilevers 35 on the underside of the trough flanges are flexed and the arms 30 of the wire suspension device ride upwardly on the ramps 36 against the tension of the springs 37. The combined strength of the two springs 37 is approximately equivalent to the strength of the spring 31. The further depression of the fulcrummed lever by the weight of water in the trough as described causes its arm 20 to press the valve rod 18 inwardly. The leverage exerted on the arm 20 progressively increases as the roller 34 descends the ramp 32 and consequently the inward force on the valve rod 18 is progressively increased until such time as the inlet port of the valve is tightly closed by the flexible disc and a "closed-tap" condition prevails when the water has reached a predetermined level in the trough.

As the quantity of water within the trough decreases, the fulcrummed lever 14 gradually rises under the influence of the flexed cantilevers 22 and 35 and the tension of the springs 23, 31 and 37, all acting in unison, until an open-tap condition is again restored. In the upward movement of the lever 14 with consequential pivotal upward movement of the inner end of the trough, the roller 34 travels upwardly on the ramp 32 while the arms 30 of the wire suspension device ride downwardly on their relative ramps 36.

What I do claim is:

1. An appliance for watering poultry comprising, a drinking trough, means for pivotally suspending the outer end of said trough, a valve for horizontal fitment to a pipe of a water supply system to control the flow of water, a pipe for discharging water from the valve into said trough, a fulcrummed lever having at its inner end an arm adapted to actuate said valve, a ramp mounted on the outer end portion of said lever, a first spring means tending to maintain said lever upwardly inclined with its valve-actuating arm inoperative, a trough suspension device connected to the inner end portion of the trough, second spring means tending to maintain said suspension device in raised position, and a member at the upper end of said suspension device adapted in the depression of said lever by weight of water in the trough to travel downwardly on said ramp against the tension of both said spring means, causing a progressively increasing leverage to be exerted by the lever arm on the valve, and to travel upwardly on said ramp when said lever under the influence of said spring means rises as the water within said trough decreases.

2. An appliance for watering poultry according to claim 1, wherein the lever is fulcrummed to the valve casing, the ramp has a stay member, said suspension device being a loop wherein is revolvably fitted said member having the shape of a grooved roller to travel on said ramp, and means are provided for adjusting the normal upwardly inclined setting of said lever for flow of water.

3. An appliance for watering poultry according to claim 1, wherein said spring means consist of a flexible cantilever mounted on the fulcrummed lever, a coupling strip made with a series of holes for adjustment and adjustably and detachably connected to the valve casing, and a tension spring interposed between the cantilever and the coupling strip, and a separate tension spring is provided which connects the outer end of the cantilever with the top of the suspension device for the inner end portion of the trough.

4. An appliance for watering poultry comprising a drinking trough having at its upper end a relatively wide outward flange on each side, means for pivotally suspending the outer end of said trough, a valve for horizontal fitment to a pipe of a water supply system to control the flow of water, a pipe for discharging water from the valve into said trough, a lever fulcrummed to the valve casing and having a downwardly projecting arm adapted to actuate said valve, a flexible cantilever mounted on said fulcrummed lever, a spring connection between the cantilever and the valve casing tending to maintain said fulcrummed lever upwardly inclined with the cantilever off-centre, a ramp fitted on said fulcrummed lever, a suspension device connected at its lower end to the trough flanges, a tension spring connecting the upper end of said suspension device with the outer end of the cantilever, and a grooved roller carried by said suspension device which is caused by weight of water delivered into the trough to travel downwardly on said ramp against the tension of said springs whereby said fulcrummed lever is depressed, the inner end of the trough is pivotally lowered and progressively increasing leverage is exerted by the lever arm on the valve to close the same.

5. An appliance for watering poultry according to claim 4, wherein the spring connection between the cantilever and the valve casing includes a link having a series of adjustment holes, and a pin is provided on the valve-casing for insertion in a selected hole of the series whereby the upwardly inclined setting of the fulcrummed lever can be regulated to suit different pressures in water supply systems.

6. An appliance for watering poultry according to claim 4, wherein the means for pivotally suspending the outer end of the drinking trough consists of an upright, a hook-shaped bracket secured to said upright, and a wire frame which extends longitudinally beyond the outer end of the trough and is detachably engaged by said hook-shaped bracket.

7. An appliance for watering poultry according to claim 4, wherein the suspension device for the inner end portion of the trough comprises a member substantially of inverted V-shape having at its upper end a loop revolvably accommodating the grooved roller, and at its lower end two lateral members of U-shape which are set oppositely and each with its branches extending inwardly above and below the relative flange of the trough.

8. An appliance for watering poultry according to claim 4, wherein a cantilever and a ramp are fitted adjustably to the underneath surface of each of the longitudinal flanges of the trough in angular settings opposite to similar components mounted on the fulcrummed lever, tension springs connect said cantilevers with the lower branches of the U-shaped members of the trough suspension device and said lower branches are adapted to ride upwardly on said ramps against the tension of said springs as the trough is caused by weight of its water contents to descend, and to ride downwardly on said ramps under the influence of said springs as the trough is caused to rise by diminution of the water contents.

JOHN GILBERT FRANCIS.